United States Patent [19]

Grimes, deceased et al.

[11] Patent Number: 4,756,671

[45] Date of Patent: Jul. 12, 1988

[54] LOW DAMAGE HYDRAULIC FISH PUMPING SYSTEM

[75] Inventors: Eldon L. Grimes, deceased, late of King County, Wash.; by Monterey Grimes, executrix, Seattle, Wash.

[73] Assignee: Marco Seattle, Inc., Seattle, Wash.

[21] Appl. No.: 470,063

[22] Filed: Feb. 28, 1983

[51] Int. Cl.$^4$ ................................................. F04F 5/22
[52] U.S. Cl. ........................................ 417/53; 43/4.5; 417/85; 417/90; 417/108; 417/405
[58] Field of Search ...................... 417/85, 86, 90, 91, 417/244, 108, 405, 406, 409; 119/3; 43/4, 4.5, 6.5

[56] References Cited

U.S. PATENT DOCUMENTS

| | | |
|---|---|---|
| 646,640 | 4/1900 | Evans . |
| 1,319,797 | 10/1919 | Rogers ................................. 417/90 |
| 2,148,131 | 2/1939 | Parker . |
| 2,192,480 | 3/1940 | Norman et al. ...................... 417/90 |
| 2,200,943 | 5/1940 | Wilson et al. ......................... 417/90 |
| 2,571,932 | 10/1951 | Olsson . |
| 2,736,121 | 2/1956 | Kimmerle . |
| 3,010,232 | 11/1961 | Skakel et al. . |
| 3,175,515 | 3/1965 | Cheely . |
| 3,314,184 | 4/1967 | Lerch . |
| 3,393,519 | 7/1968 | Mitchell . |
| 3,421,245 | 1/1969 | Lerch . |
| 3,448,691 | 6/1969 | Frazier . |
| 4,028,009 | 6/1967 | Gudzenko et al. . |
| 4,155,682 | 5/1979 | Hillis . |

FOREIGN PATENT DOCUMENTS

| | | |
|---|---|---|
| 1026995 | 2/1978 | Canada . |
| 842282 | 6/1952 | Netherlands . |
| 2546012 | 4/1976 | Netherlands . |
| 117668 | 12/1965 | Norway . |

OTHER PUBLICATIONS

"An Air-Lift Pump for Elevating Salmon, Herring, and Other Fish of Similar Size," *Journal Fisheries Research Board of Canada*, vol. 21, No. 4, 1964.

Primary Examiner—Edward K. Look
Attorney, Agent, or Firm—Christensen, O'Connor, Johnson & Kindness

[57] ABSTRACT

A submersible rotary impeller fish pump augmented by the release of large volumes of pressurized air into the pump's discharge stream during pump operation enables the pumping of fish or other water-borne articles to the same or greater heights at materially lower impeller speeds and with less impeller damage than the same pump unaided.

2 Claims, 1 Drawing Sheet

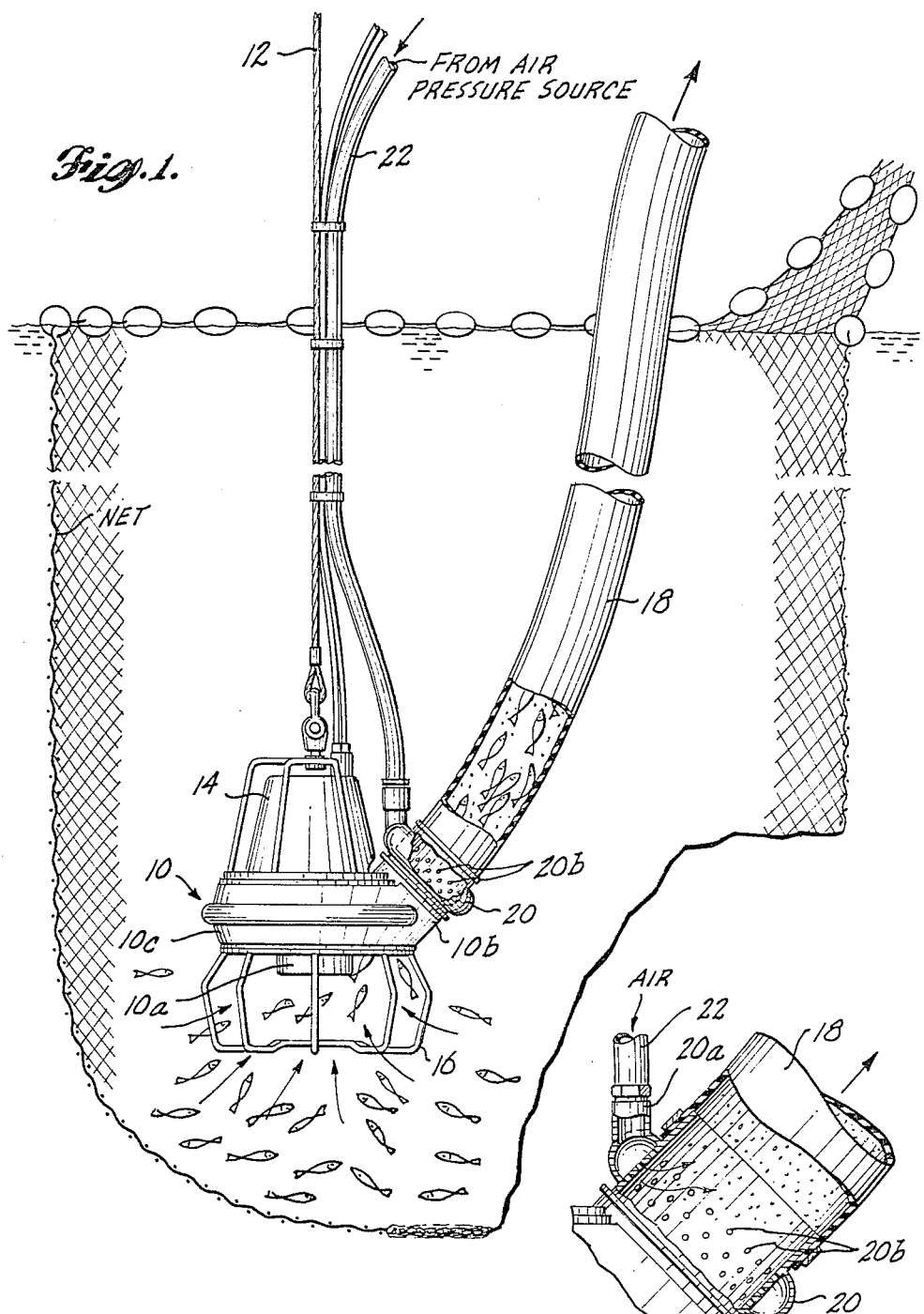

LOW DAMAGE HYDRAULIC FISH PUMPING SYSTEM

BACKGROUND OF THE INVENTION

This invention relates to improvements in methods and apparatus for elevating masses of fish and other articles with minimum damage employing a submersible rotary impeller-type pump as the primary pressure source. The invention is herein illustratively described by reference to the presently preferred form thereof; however, it will be recognized that certain modifications and changes with respect to details may be employed within the scope of the invention.

Lerch, U.S. Pat. Nos. 3,314,184 and 3,421,245, disclose significant advancements in the art of fish pumping, such as in brailing nets and in transferring fish from the holds of vessels to dockside or to other vessels. The portable compactness, operating reliability, high volumetric pumping capacity and versatility of rotary impeller submersible fish pump transfer systems disclosed in those patents gained early and widespread acceptance by the commercial fisheries of many countries. However, the incidents of flesh damage due to fish passing through the pump impeller has remained a serious limitation on the applicability of such systems, at least in some fisheries. For example, flesh damage of fish to be used in fishmeal plants causes significant loss of valuable proteins through leaching. The extent of flesh damage incurred becomes greater as pumping height is increased inasmuch as the pump rotor must be driven at correspondingly higher speeds, and larger and softer fish are naturally more vulnerable.

In one prior art effort to reduce flesh damage, a jet pump was used rather than a rotary impeller pump as the primary pumping device. That system utilized a suction hose with an inlet submersible in the water, with an air nozzle mounted at or near the inlet. A water jet pump mounted in the hose above the air injection nozzle directed its flow upwardly in the hose to induce flow upwardly to and above the jet.

A broad object of this invention is to greatly reduce, if not altogether overcome, the problem of damage as a material factor in commercial systems for pumping fish and other articles using a submersible rotary impeller pump as the primary pressure source. A related object is to permit pumping to the same or greater heights than were heretofore attainable with submersible rotary impeller pumps and with much less damage to the fish or other articles pumped.

A related further object is to devise such a system operable at any of wide-ranging submersion depths, and which indeed gains in operating efficiency and in reduction of flesh damage with increased operating depth.

It is also an object to achieve those advancements while retaining the described advantages of portable compactness, operating reliability, high volumetric capacity and versatility of use, and all without adding materially to the cost of the system.

SUMMARY OF THE INVENTION

In accordance with this invention as disclosed herein, the submersible pump's discharge is forced upwardly through the transfer conduit primarily by pump pressure to whatever elevation above water level is required by the setting, and with the pump submerged in the water to whatever depth is required in order to reach the fish with the pump's suction inlet. The objectives of the invention are achieved by injecting large volumes of displacement air under pressure into the pump's discharge stream of fish and water as close as practicable to the outlet or pressure side of the pump continuously during pump operation. A blower coupled through an air hose to an air injection nozzle mounted in or adjacent to the pump's outlet injects air at such a volumetric rate as to materially reduce the average density of the rising column of fish and water in the transfer conduit, a factor which, coupled with the inherent elevating entrainment effect of the rising streams of air bubbles and the probable reduction of friction losses in the transfer conduit, enables the system to operate effectively with the pump rotated at a much lower rotor speed than in the prior systems for a given pumping height above water level. Consequently, the improved system can serve efficiently and effectively in applications wherein impeller damage caused to the fish or other articles without such air injection made prior submersible rotary pump systems impractical or at least of limited applicability.

These and related features, objects and advantages of the improved system will become more fully apparent as the description proceeds by reference to the accompany drawing.

BRIEF DESCRIPTION OF DRAWINGS

FIG. 1 depicts a system employing the invention in its presently preferred embodiment as applied to the brailing of fishing nets.

FIG. 2 is an enlarged sectional view of the air nozzle and adjacent parts.

DETAILED DESCRIPTION REFERRING TO DRAWING

In the drawings, a submersible fish pump 10 suitably housed or encapsulated for operating at varying depths is suspended from a rigging cable 12 hung from a suitable boom or davit (not shown) on a boat, dock or other installation. In the illustrated application, fish pump 10 is being operated within the enclosure of a fishing net for brailing purposes while the net is being progressively "dried" by strapping and hauling it into the vessel. In some fisheries, particularly with a full catch, it is desirable to lower the pump deep into the net early during the haul in order to expedite the process of brailing and thereby increase the efficiency of the overall operation. Therefore, it is desirable to employ a fish pump that can be operated efficiently at water depths as great as 50 feet or more and at shallower levels as the operation proceeds.

In the illustration, fish pump 10 is preferably of the centrifugal type wherein the impeller (not shown) is mounted to rotate on a central vertical axis within the main casing 10c. Impeller drive motor 14 is housed and mounted on the topside of the casing 10c. Motor 14 is preferably of the hydraulic type served through hydraulic pressure and return hoses 30 and 32 from a hydraulic pressure source (not shown) mounted and controlled at a convenient location on the boat deck or dock where the rigging is installed. It will be understood that the hydraulic controls for hydraulic motor 14 are or may be of a conventional type enabling the operator to vary the rotational speed of the motor so as to meet the situational operating requirements.

The pump's suction inlet 10a, central to the impeller casing 10c, opens downwardly from the central part of the casing so as to draw water with fish into the impeller cavity for discharge through the peripherally located outlet 10b. The latter comprises a tubular extension fitting which angles tangentially outwardly and upwardly from the casing periphery for connection to the lower end of the flexible discharge hose or transfer conduit 18. Surrounding the pump inlet beneath housing 10c is an open grid work 16 which serves to keep the inlet 10a spaced from netting and/or other objects while affording openings large enough for passage of the fish into the inlet.

Transfer conduit or hose 18 is coupled to the pump discharge outlet 10b by a suitable fitting which, in this case, functions also as an air injection nozzle 20. Nozzle 20 is in the form of a toroidal housing with an inside annular wall having a plurality of apertures 20b opening into the discharge stream of the pump from all sides, the housing forming a toroidal air plenum chamber. The nozzle plenum is pressurized through a fitting 20a coupled to a flexible air hose 22. Flexible hose 22 extends to a low pressure blower or other positive air pressure source (not shown) for injection of air under pressure into the fish pump hose 18 at the discharge side of pump 10. It is preferred to locate the air injection nozzle 20 immediately adjacent to the discharge or pressure side of pump 10 so as to maximize the effect of the air in achieving the objectives of the invention, namely materially reducing the average density of the column of water and fish being pumped, and thereby the static head to be overcome by the pump, reducing friction losses in the hose 18, and in achieving the supplemental lifting effect of the rising streams of air bubbles in hose 18.

Mention has been made of using a low pressure air blower as suitable to deliver air under adequate positive pressure to the plenum chamber of nozzle 20. It will be recognized, however, that any suitable air pressure source may be used for the purpose having the requisite volumetric delivery rate capacity and output pressure.

Through experience in the varying requirements of each installation and application, the operator can soon optimize the settings of pump impeller speed and blower drive speed which will be effective to pump the fish to the required height above water level and at the maximum rate of flow short of damaging the fish by excessive pump speed. In one system, for example, it was quickly found possible with the addition of air injection, as indicated, to reduce the impeller speed to half of the speed necessary to raise the contents of the transfer hose 18 to a given height above water without the air injection.

Reference has been made in the illustration to use of a centrifugal-type pump. However, it will be realized that the invention may also be applied in systems employing other types of rotary impeller pumps. These and similar variations of choice in design are contemplated inasmuch as the inventive concept and the scope thereof need not be confined to implementation in any particular detailed manner.

The embodiments of the invention in which an exclusive property or privilege is claimed are as follows:

1. In a method for pumping a mixture of fish and water from below the surface of a body of water to an elevation above the said surface by means of a pump located beneath said surface and a conduit extending from the outlet of the pump to said elevation, the improvement comprising the steps of:

injecting air under pressure into the conduit adjacent the outlet of the pump; and operating the pump at a speed less than the speed that would be required to operate the same pump to pump the mixture to said elevation absent injection of air, thereby reducing the amount of physical damage to the fish.

2. The method of claim 1, wherein the air is injected into the conduit through a plurality of apertures spaced apart about the circumference of the conduit.

* * * * *